United States Patent [19]

Magnier et al.

[11] 4,321,244

[45] Mar. 23, 1982

[54] PROCESS FOR THE TREATMENT OF A CALCIUM ALUMINOPHOSPHATE

[75] Inventors: Claude Magnier, Paris; Jean Grosbois, L'Isle Adam, both of France

[73] Assignee: Groupement Franco-Senagalais d'Etudes et de Recherches Industrielles, Courbevoie, France

[21] Appl. No.: 175,583

[22] Filed: Aug. 5, 1980

[30] Foreign Application Priority Data

Sep. 7, 1979 [FR] France ............................ 79 22393

[51] Int. Cl.$^3$ .......................................... C01B 25/16
[52] U.S. Cl. ................................. 423/320; 423/167; 423/522; 423/132; 423/150
[58] Field of Search ................ 423/320, 321 S, 321 R, 423/167, 319, 522, 132, 150

[56] References Cited

U.S. PATENT DOCUMENTS

| | | | |
|---|---|---|---|
| 2,504,544 | 4/1950 | Legal | 23/165 |
| 3,124,419 | 3/1964 | Germain et al. | 423/321 R |
| 3,161,467 | 12/1964 | Hignett et al. | 423/320 |
| 3,420,628 | 1/1969 | Robinson | 423/320 |
| 3,562,769 | 2/1971 | Sugahara et al. | 423/320 |

FOREIGN PATENT DOCUMENTS

| | | |
|---|---|---|
| 952504 | 5/1949 | France . |
| 636964 | 5/1950 | United Kingdom . |
| 733880 | 7/1955 | United Kingdom . |
| 1128104 | 9/1968 | United Kingdom . |
| 1201837 | 8/1970 | United Kingdom . |
| 1370534 | 10/1974 | United Kingdom . |
| 1432579 | 4/1976 | United Kingdom . |

OTHER PUBLICATIONS

Bridges et al., Producing Acid from Low Grade Phosphatic Materials, CEP, Nov. 1978, pp. 62–65.
Legal et al., Phosphoric Acid by the Clinker Process, I&EC, Mar. 1957, pp. 334–337.

*Primary Examiner*—O. R. Vertiz
*Assistant Examiner*—Gregory A. Heller

[57] ABSTRACT

A process for treating a rock essentially constituted by calcium aluminophosphate, comprising the treatment of the ground rock with a concentrated sulfuric acid in stoichiometric excess with respect to calcium and aluminum, at a temperature of above about 120° C., for a time between a few minutes and about 5 hours, followed by controlled water take-up. Subsequently, a residue containing substantially all the calcium and the aluminum of the rock and a solution of the acids serving to digest a tricalciumphosphate charge are separated. The process is particularly suitable for the treatment of Thies phosphate ore.

19 Claims, 1 Drawing Figure

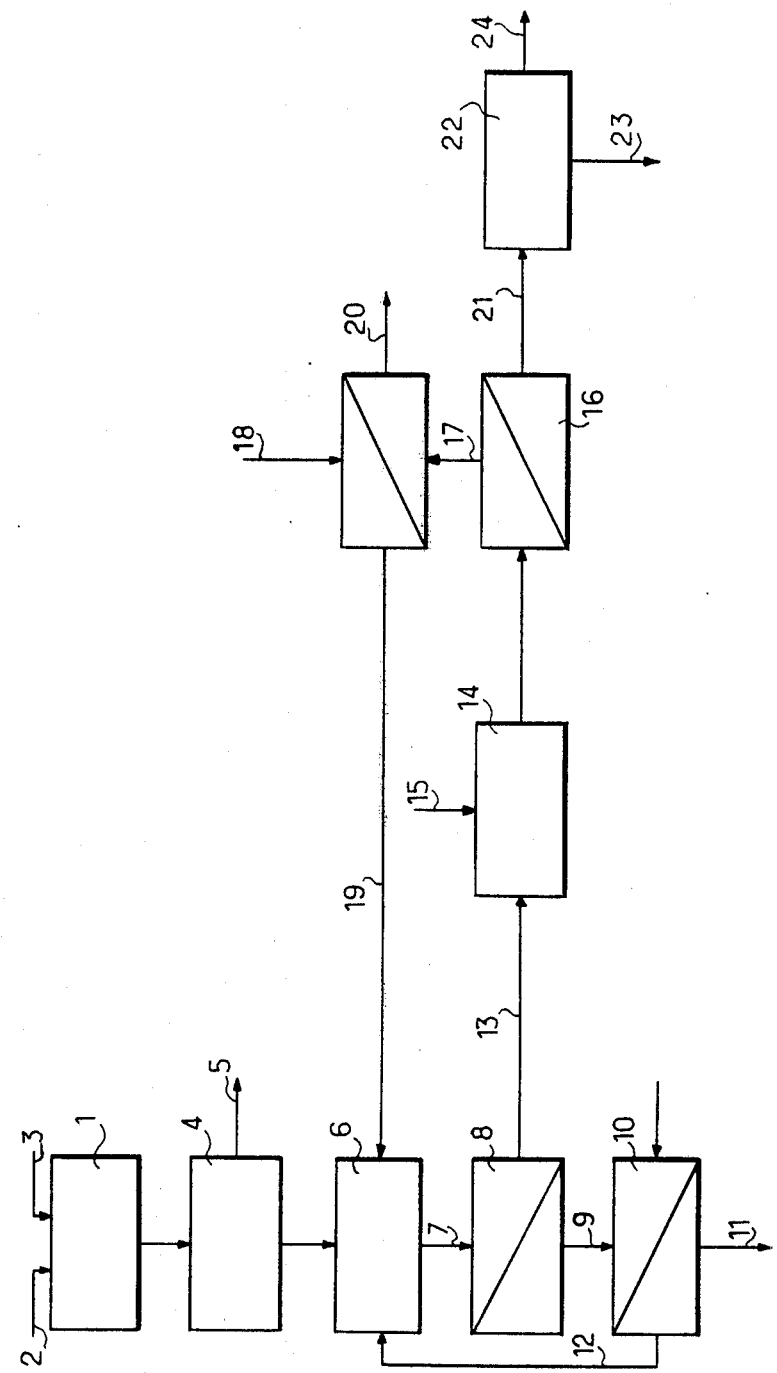

PROCESS FOR THE TREATMENT OF A CALCIUM ALUMINOPHOSPHATE

BACKGROUND OF THE INVENTION

The present invention relates to a process for the treatment of an ore substantially comprising a calcium aluminophosphate, and it more specifically relates to treatment serving to extract therefrom phosphorus in the form of $P_2O_5$.

It has long been known to treat natural phosphates with a strong acid, such as sulfuric acid, in order to solubilize the rock and recover the phosphoric acid from the leaching solution.

In general, the phosphatic rocks used are constituted by calcium phosphates, such as apatites containing a small quantity of other metals, such as aluminum or iron. However, there is another type of phosphatic rock able to supply phosphoric acid, namely, calcium aluminophosphate which is more particularly found in the Thies deposits in Senegal where aluminum extraction can be carried out in an advantageous manner. This ore is generally in the form of two phases having substantially identical compositions and represented by the standard formula: $CaAl_3(PO_4)_2(OH)_5 \cdot H_2O$. Numerous processes have already been proposed for the successful utilization of this ore and, more particularly, calcium aluminophosphates. Examples are thermal reductions supplying the phosphorus, alkaline leaching supplying an alkali metal phosphate, and an alkali metal aluminate which must then be separated to recover a phosphate and metallurgical alumina, wet acid leaching used with sulfuric acid supplying a calcium sulfate which is filtered, and a phosphoric ammonium sulfate solution which is precipitated in the form of alum by adding ammonium bisulfate, etc.

All these processes require numerous, complex, and time-consuming operations, which provide difficult separations of the aluminum and the phosphorus with low yields and often by-products, which it is difficult to utilize. For this reason, they are not used on an industrial scale. This is also the reason why the industry is seeking an industrially profitable process for leaching calcium aluminophosphate ores and for separating aluminum and phosphorus recoverable in a workable form.

It is, accordingly, an object of the present invention to provide an improved process for leaching calcium aluminophosphates.

It is a further object of the present invention to provide a process for treating calcium aluminophosphates, which process avoids the disadvantages of prior art processes described above.

It is also an object of the present invention to provide an improved process which is suitable for operations on an industrial scale.

Other objects will be apparent to those skilled in the art from the present description, taken in conjunction with the appended drawing, which is a flow diagram illustrating the embodiment of Example 3, below.

GENERAL DESCRIPTION OF THE INVENTION

The present invention is based on the discovery that by leaching a calcium aluminophosphate containing, for example, iron, by concentrated sulfuric acid in excess, at a given temperature for a given time, a paste is obtained which, by controlled take-up with water in a selected quantity and for a selected period, makes it possible to obtain a good selectivity of the phosphorus and aluminum (and of the iron), the aluminum and iron phosphates in the anhydrous state having a solubilization rate in water which is slower than that of hydrated sulfates and also that of phosphate ions.

The present invention comprises a process for leaching a phosphatic rock substantially constituted by calcium aluminophosphate, which may contain iron and other metals in small concentrations, in which the ground rock undergoes treatment with concentrated sulfuric acid in stoichiometric excess with respect to the aluminum, calcium, and iron ions contained in the rock above about 0.2, and, preferably, approximately 0.5, for a time between about 3 and 4 hours at a temperature above 120° C., preferably between 230° and 240° C. As a result, a calcined paste is obtained which contains substantially anhydrous aluminum sulfate and iron sulfate, as well as phosphoric acid.

The process of the invention also comprises the controlled take-up with water of the calcined paste obtained in a water/paste weight ratio between about 0.2 and 5, preferably between about 0.8 and 1.2, at a temperature below 100° C., preferably between 0° and 40° C., for a time between 1 minute and about 1 hour, preferably between about 5 and 15 minutes, and there is separation of a sulfuric acid aqueous phase containing the phosphoric acid and a residue containing substantially all iron, aluminum, and calcium from the starting rock material.

According to the process of the invention, the starting calcium aluminophosphate is represented in a typical manner by Thies phosphate containing the two phases referred to hereinabove, as well as a generally small quantity of iron. In general terms, the weight composition of Thies phosphate is as follows:

$P_2O_5$: 30% by weight
$Al_2O_3$: 30% by weight
$Fe_2O_3$: 8.7% by weight
CaO: 8.5% by weight
$H_2O$: 16% by weight
Miscellaneous: 6.8% by weight Before being treated with sulfuric acid, the initial phosphatic rock is finely ground in order to increase the exchange between the solid and liquid phases. The grain size distribution of the rock is preferably below about 160 microns.

The initial phosphatic rock is preferably dry in order to prevent dilution of the leaching sulfuric acid. However, it is preferably not calcined in order to improve the effect on the P/Al or Fe selectivity and the $P_2O_5$ solubilization yield.

The term "concentrated sulfuric acid" is understood to mean an acid generally having a concentration above about 90 percent and preferably above about 96 percent.

The concentrated sulfuric acid quantity necessary for treating the calcium aluminophosphate according to the invention must exceed the stoichiometric quantity necessary for converting all the metallic constituents of the rock into neutral sulfates in order to obtain at least neutral salts which become anhydrous at the calcination temperature used.

In addition, the present applicants have found that once the anhydrous reaction mixture has been made, the $P_2O_5$ solubilization yield is linked with the $H_2SO_4$ residual stoichiometry and that the latter significantly decreases and comes close to zero when the sulfuric acid excess drops. Without wishing to link this with any particular theory, it is thought that these results show that, e.g., the following equilibrium exists:

$$3H_2SO_4 + 2Al(H_2PO_4)_3 \rightleftharpoons Al_2(SO_4)_3 + 6H_3PO_4$$

During calcination, this reaction is followed by the appearance of insoluble aluminum polyphosphates and, consequently, it is necessary to displace the equilibrium by a sulfuric acid excess.

Applicants have also found that it was not advantageous to partly divide up this sulfuric acid excess between the leaching of the rock by pasting and sulfuric calcination and the subsequent controlled take-up with water, because in the latter case, the overall $P_2O_5$ solubilization is not improved and that, in fact, aluminum and iron solubilize more rapidly on aqueous take-up, which to the same extent reduces the selectivity of the process. Thus, all the sulfuric acid introduced into the process should be introduced at the time of leaching and pasting/calcination of the phosphatic rock. The residual sulfuric acid excess relative to the stoichiometry introduced on etching is a function of the reaction temperature and generally exceeds about 0.2, being preferably close to about 0.5.

The reaction temperature is generally between about 120° and 350° C., preferably between about 200° and 300° C., more particularly between about 240° and 250° C.

During the prior calcination treatment in the presence of sulfuric acid, the phosphatic rock disintegrates with phosphoric acid and acid or neutral salts of the different metals production, the latter being hydrated to a greater or lesser extent and which at the indicated temperature supply anhydrous salts and water vapor under the reaction conditions which is then eliminated. The water loss of the pasted mass is the fundamental parameter which subsequently controls the solubilizing rate of the aluminum and iron sulfates during the control take-up by water and, consequently, the process selectively of the P/Al and P/Fe. When the pasting temperature is below about 100° C., it becomes virtually impossible to dehydrate the aluminum and iron sulfates. Between about 120° and 200° C., the necessary leaching times for obtaining anhydrous sulfates and, consequently, the sought selectivity, are scarcely compatible with an industrial process (requiring over 5 hours), although the result can be obtained. Beyond about 250° C., there is a significant sulfuric acid loss, and beyond 500° C., although the water losses are very fast and there is a rapid dehydration of the sulfates, conversely there is a reduction in the $P_2O_5$ solubilization yield and the selectivity, probably as a result of the increase in the proportion of insoluble aluminum polyphosphate formed, as suggested hereinabove.

The reaction time is selected as a function of the temperature applied, in such a way that there is a weight loss of the mixture, which is substantially equal to the theoretical water loss. For information purposes, the weight loss is 35 g. of water per 100 g. of Thies phosphate with an $H_2SO_4$ stoichiometric excess of 0.5.

Conventionally, the reaction time is between a few minutes and about 5 hours, preferably between about 2 and 4 hours.

The preferred reaction temperature is between about 230° and 250° C., linked with a preferred reaction time of about 3 to 4 hours.

The preceding sulfuric pasting reaction is performed in a known reaction apparatus, such as a static reactor or a reactor with a rotary oven or kiln and scavenging, together with direct or indirect heating. The phosphate/sulfuric acid reaction mixture is preferably prepared by using a continuous screw-type mixer which delivers the mixture to the intake of the rotary oven, where it is calcined. Normally, the components of the mixture are introduced cold. During the initial mixing, whose duration is not critical, heating by reaction occurs which can be up to about 100° C.

Once the calcination in the presence of sulfuric acid is at an end, the reaction mass is cooled. It then undergoes control take-up by means of water or an acid aqueous solution. The determinative parameters of this control take-up stage in order to obtain a high $P_2O_5$ solubilization yield, together with a high P/Al or Fe selectivity, are the temperature, duration and weight ratio of the take-up water/calcined pasted mass.

In the same way, the reaction conditions during pasting can influence the $P_2O_5$ yield and the P/Al selectivity. Thus, when the pasting/calcination temperature rises the overall $P_2O_5$ yield also increases. However, as has been stated hereinbefore, in the case of increasing pasting temperatures (above 300° C.), the aluminum sulfate solubilization rate also increases, so that the selectivity is reduced to the same extent. Moreover, in the pasting temperature range of about 120° to 500° C., the $P_2O_5$ solubilization kinetics vary very little. Moreover, the sulfuric acid excess on pasting only influences the maximum yields and not the solubilization kinetics.

The controlled water take-up temperature must be as low as possible because it mainly affects the iron and aluminum sulfate solubilization kinetics. For good P/Al or Fe selectivity, water take-up is generally at a temperature below about 100° C., and preferably below about 50° C., particular preference being given to ambient temperature or an even lower temperature.

The take-up water/reaction mass weight ratio resulting from the pasting by sulfuric acid is conventionally between about 0.2 and 5, and preferably between about 0.8 and 1.2. Obviously, this ratio must be as low as possible in order to obtain the most concentrated possible $P_2O_5$ solution compatible with an optimum $P_2O_5$ solubilization and an easy technological manipulation of the paste taken up with water.

The water take-up time must be the shortest possible time compatible with the maximum possible $P_2O_5$ yield in order to obtain a high P/Al or Fe selectivity. Thus, all things being equal, the selectivity results from differences in the $P_2O_5$ dissolving kinetics and the rehydration solubilization kinetics of the anhydrous aluminum and iron sulfates. The water take-up time is also a function of the temperature at which it is performed. Generally, the water take-up time is between 1 minute and about 1 hour, preferably between about 1 minute and 15 minutes. Thus, for water take-up performed at 40° C., the duration is preferably between about 1 and 5 minutes, while for water take-up at 0° C., it is preferably between about 10 and 15 minutes.

Following the controlled water take-up stage, the resulting mass is filtered leading to an aqeuous phase of sulfuric acid and phosphoric acid and a solid residue substantially containing aluminum, iron, and other cations present in the initial phosphatic rock. Normally, in a continuous industrial process, the filter cake is washed with water, preferably in counter-flow, in order to extract the final phosphoric acid traces. Preferably, this washing is performed in a short time, generally less than 1 minute, in order to obtain, after filtering, an aqueous washing solution which is not excessively enriched by aluminum and iron. The filtrate obtained on washing can be combined with the previously controlled take-up water, but, in certain cases, all the water necessary for the controlled take-up can be obtained from the previous washing process, as a function of the water quantities used for the controlled take-up and for washing. The weight ratio of the water quantity used for washing the initial pasted reaction mass is conventionally between about 0.2 and 5, preferably between about 0.8 and 1.2.

The filtration flow obtained, which is constituted by sulfuric acid and phosphoric acid in water, contains small quantities of aluminum and iron. The aluminum and iron solubilization yields expressed by the weight ratios of the quantities of said metals in the production solution to those present in the starting rock can be as low as 3 percent for both aluminum and for iron. However, the weight ratio of the $P_2O_5$ quantity present in the take-up solution to the quantity present in the starting rock can be as high as 80 percent. Its phosphoric acid concentration is a function of the controlled take-up conditions and particularly the weight ratio of $H_2O$ to calcined mass and, if appropriate, the recycling of the filter cake washing water. Conventionally, the concentration is between about 5 and 20 percent by weight of $P_2O_5$. The sulfuric acid concentration of this filtrate is a function of the stoichiometric sulfuric acid excess during the calcination stage, the calcination temperature and time, and obviously the control water take-up conditions. Normally, the sulfuric acid concentration is between about 10 and 30 percent by weight of $H_2SO_4$.

The sulfuric leaching and water take-up process according to the invention can be used with particular advantage for treating calcium aluminophosphates, which may contain iron, such as Thies phosphate in ore. The $P_2O_5$ yield compared with the $P_2O_5$ contained in the starting rock can be as high as 80 percent with $P_2O_5/Al_2O_3$ and $P_2O_5/Fe_2O_3$ selectivities as high as 22 and 75, respectively, expressed by weight, while the $P_2O_5/Al_2O_3$ and $P_2O_5/Fe_2O_3$ weight ratios are, for example, approximately 1 and 3.5 in the case of the calcium aluminophosphate of the Thies deposits.

The cake resulting from the filtering process and, if applicable, the previous washing process can be then treated to recover metals using processes which do not form part of the present invention.

The aqueous filtering solution can be converted into alkali metal or alkaline-earth sulfates and phosphates. It is also possible to recover therefrom phosphoric acid by liquid-liquid extractions using solvents which are not miscible with water. Finally, in a third preferred variant, the process of the invention also incorporates the use of the aqueous solution of phosphoric and sulfuric acid constituting the filtrate after control take-up with water of the sulfuric calcination product of the calcium aluminophosphate rock as the leaching solution for a calcium phosphate rock, which may contain small quantities of aluminum and/or iron. The result is that a calcium sulfate precipitate and an aqueous solution essentially of crude phosphoric acid are obtained.

According to this variant, the leaching solution of the calcium phosphate rock has sulfuric and phosphoric acid concentrations as described hereinbefore. If appropriate, prior to its use as a leaching solution, it can be concentrated in per se known manner, and the $P_2O_5$ weight concentration can be up to about 25 percent, with a $H_2SO_4$ concentration of about 40 percent. It is also possible to recover therefrom the utilizable volatile constituents, such as fluoric substances.

The calcium phosphate rock used comprises well-known ores, such as, for example, apatites essentially constituted by tricalcium phosphate which may contain metals in the weakly concentrated state, such as aluminum and iron or in the trace state, such as uranium and rare earths.

The leaching solution quantity defined hereinbefore and used for reacting with the calcium phosphate rock defined hereinbefore is such that there is essentially a stoichiometric equilibrium between the sulfuric acids present in the solution and the cations present in the calcium phosphate rock, the reaction being quantitative. However, in practice and for optimum solubilization of the calcium phosphate rock, it is possible to work with a slight stoichiometric sulfuric acid excess.

The operating conditions for the leaching process are well known in the art, with respect to the temperatures, times, apparatus, etc.

Following the aforementioned reaction, a calcium sulfate suspension is obtained in an aqueous solution, substantially constituted by crude phosphoric acid. The suspension is then filtered in per se known manner leading to the separation of the calcium sulfate and an aqueous solution essentially containing crude phosphoric acid which constitutes the production. This crude phosphoric acid solution then undergoes known treatments, such as, for example, concentration, defluorination, extraction by means of organic solvents to extract therefrom the utilizable cations (uranium, rare earths), or to extract therefrom the purified phosphoric acid. Alternatively, it can be used as such as a starting substance for phosphate fertilizers.

The aforementioned improved variant more particularly applies to a mixed leaching of calcium aluminophosphate and calcium phosphate, utilizing the stoichiometric sulfuric acid excess necessary during the sulfuric calcination of the calcium aluminophosphate rock.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

100 g. of Thies phosphate, whose composition has been given above, and with particle sizes below 160μ, were mixed with quantities of 96 percent $H_2SO_4$ given in Table I, below. Mixing then took place for 10 minutes during which the temperature rose to 100° C. The paste obtained was then introduced into a static atmosphere oven at a temperature and for a time given in Table I, below. Following calcination, the mass was cooled to 25° C., and it was taken up by water in a water/calcined mass ratio of 1 for 15 minutes, followed by filtering. $P_2O_5$, $Al_2O_3$, and $Fe_2O_3$ were then metered in the filtrate, and the $\rho P_2O_5$, $\rho Al_2O_3$, and $\rho Fe_2O_3$ were calculated, giving the solubilization yield of the components of the ore. The Table also shows the weight losses $\Delta P/100$ g. of phosphate during the calcination operations and which essentially represent the water loss.

Comparison of Tests 1, 2, and 3 shows that an inadequate calcination (Tests 1 and 3) provides a poor selectivity between $P_2O_5$ and $Al_2O_3$ and $P_2O_5$ and $Fe_2O_3$, taking account of the limited dehydration of the aluminum and iron sulfates and, consequently, a rapid dissolving rate thereof.

Test 4 shows that when the calcination was performed at an increasing temperature, the solubilized $P_2O_5$ quantity decreased. In the same way, the comparison of Tests 2, 5, and 6 shows that a reduction in the $H_2SO_4$ excess reduced to the same extent the solubilized $P_2O_5$ yield.

EXAMPLE 2

This example illustrates the influence of the take-up water quantity, its temperature and duration.

The take-up parameters and the results obtained are shown in Table II, below.

The calcined mass was obtained by mixing 100 g. of Thies phosphate with 186 g. of 96 percent $H_2SO_4$ under the same conditions as in Example 1, above. This was followed by calcining the mass at 230° C. for 5 hours. The pasted mass was cooled at ambient temperature and was taken up and then filtered under the conditions and with the results indicated in Table II. The $P_2O_5/Al_2O_3$ weight ratio is that of the filtrate.

Tests 2 and 7 show that too great a drop of the $H_2O$/calcined mass weight ratio limits the $P_2O_5$ yields.

Comparison of Tests 2 and 8 shows that a rise in the take-up temperature increased the solubilization of alumina and $Fe_2O_3$, while comparison of Tests 8 and 9 shows that an increase in the take-up time, everything else being equal, increased the solubilization of alumina and $Fe_2O_3$.

$P_2O_5$: 30%
$Al_2O_3$: 30%
$Fe_2O_4$: 8.7%
CaO: 8.5%
$H_2O$: 16%
Miscellaneous: 6.8%

The constituents were introduced at ambient temperature. The mixing time in the screw mixer was 15 minutes, at the end of which the mixture was heated by reaction to 100° C. The screw mixer delivered directly into a directly heated rotary oven or kiln operating in such a way that the mixture stayed there 4 hours at a temperature of 230° C. During the sulfuric calcination, the mixture lost 22 kg./h. of water. The paste obtained after calcination was cooled to 25° C. and introduced into vessel (6) where it underwent a control take-up at 25° C. for 5 minutes using an aqueous solution constituted by the combination in (6) of a first washing flow (12) and a second washing flow (19), as will be described hereinbelow. In this stage, the take-up water/calcined mass weight ratio was 1. The resulting suspension was transferred by (7) into a filtering means (8) where a solid mass (9) and an aqueous solution (13) were separated. The solid mass was transferred to a high speed filter (10) at 25° C., where it was washed for 1 minute by means of 60 kg./h. of water. The suspension was then rapidly filtered, leading to a separation of the residue (11) constituted by:

$Al_2(SO_4)_3$: 51.3 kg./h.
$Fe_2(SO_4)_3$: 11.1 kg./h.
$P_2O_5$: 4.0 kg./h.
$H_2O$: 35.7 kg./h.

An aqueous solution (12) was separated which was recycled at (6) to constitute a fraction of the controlled

TABLE I

| Test No. | g. of $H_2SO_4$/ 100 g. of Thies phosphate | Calcination temperature in °C. | Calcination time (hours) | Water weight loss (g./100 g. of phosphate) | $pP_2O_5$ (%) | $pAl_2O_3$ (%) | $pFe_2O_3$ (%) |
|---|---|---|---|---|---|---|---|
| 1 | 186 | 230 | 1 | ~15 | 90 | 80 | 80 |
| 2 | 186 | 230 | 5 | ~40 | 75 | 5 | 5 |
| 3 | 186 | 230 | 1 | ~25 | 80 | 65 | 65 |
| 4 | 186 | 280 | 5 | ~90 | 35 | 10 | 10 |
| 5 | 149 | 230 | 5 | ~35 | 60 | 6 | 6 |
| 6 | 124 | 230 | 5 | ~32 | 15 | 4 | 4 |

TABLE II

| Test No. | $H_2O$/calcined mass, by weight | Take-up temp. (°C.) | Take-up time (minutes) | $P_2O_5$ (%) | $Al_2O_3$ (%) | $Fe_2O_3$ (%) | $P_2O_5/Al_2O_3$ |
|---|---|---|---|---|---|---|---|
| 2 | 1.0 | 25 | 15 | 75 | 5 | 5 | 15 |
| 7 | 0.6 | 25 | 15 | 60 | 5 | 5 | 12 |
| 8 | 1.0 | 40 | 15 | 75 | 8 | 8 | 9.4 |
| 9 | 1.0 | 40 | 120 | 75 | 20 | 20 | 3.7 |

EXAMPLE 3

This example illustrates a preferred variant, which also includes the use of the aqueous take-up filtrate as the leaching solution for a calcium phosphate.

The process is described with reference to the attached drawing, which is a diagram of the material flows.

In a pilot installation operating on a continuous basis, 96.3 kg./h. of 98 percent sulfuric acid was introduced by line (2), and 53.6 kg./h. of Thies (Senegal) phosphate ore ground to a grain size of 160μ was introduced by line (3) into a screw mixer (1). The weight composition of the Thies phosphate ore was as follows:

take-up solution.

The flow of the aqueous filtering solution (13) was constituted by:
$H_2SO_4$: 31.3 kg./h.
$Al_2(SO_4)_3$: 3.4 kg./h.
$Fe_2(SO_4)_3$: 0.7 kg./h.
$P_2O_5$: 18.9 kg./h.
$H_2O$: 81.0 kg./h.

This solution was introduced as it was into a reactor (14) constituted by a stirred leaching vessel where it was brought into contact at 100° C. with 35 kg./h. of ground Taiba (Senegal) phosphate with the following weight composition:
$P_2O_5$: 37.6%

CaO: 51.4%
Miscellaneous: 11.0%

At the end of the reaction, the resulting suspension was filtered in (16) to provide a residue (17) which was washed and then filtered in unit (18) by means of 60 kg./h. of water to supply a residue (20) comprising:

gypsum: 54.9 kg./h.
sterile material: 2.8 kg./h.
water: 24.6 kg./h.

A washing solution (19) was also obtained, which was recycled in the controlled take-up unit (6). An aqueous flow (21) mainly constituted by phosphoric acid was taken from the filtering unit (16). It was concentrated in the evaporation means (22) to supply a flow of 50 kg./h. of phosphoric acid with 50 percent $P_2O_5$.

The efficiency of the installation expressed by the ratio $$\frac{P_2O_5 \text{ recovered}}{P_2O_5 \text{ of calcium aluminophosphate} + P_2O_5 \text{ from the calcium phosphate}}$$

was 86 percent.

The above results show that the stoichiometric sulfuric acid excess necessary for the calcination of calcium aluminophosphate for providing a good selectivity of the phosphorus relative to the aluminum is completely reused to stoichiometrically react with a calcium phosphate to provide a further phosphoric acid production.

The terms and expressions which have been employed are used as terms of description and not of limitation, and there is no intention in the use of such terms and expressions of excluding any equivalents shown and described or portions thereof, but it is recognized that various modifications are possible within the scope of the invention claimed.

What is claimed is:

1. A process for the treatment of phosphatic rock, essentially constituted by calcium aluminophosphates and containing iron and other cations in small concentrations, which process comprises:

(a) subjecting the ground rock to calcination treatment in the presence of concentrated sulfuric acid in stoichiometric excess with respect to the aluminum, calcium and iron contained in the starting rock for a time between about a few minutes and about five hours and at a temperature above about 120° C. to obtain a paste which contains aluminum sulfate and iron sulfate in substantially anhydrous form, phosphoric acid and sulfuric acid;

(b) subjecting the paste obtained in step (a) above to controlled take-up by means of water or an aqueous solution comprising phosphoric or sulfuric acid or both to obtain two phases, the first phase being a solid residue substantially containing aluminum, calcium and iron from the starting rock and the second phase comprising aqueous phosphoric and sulfuric acid solution;

(c) separating the second phase obtained in step (b) from the first phase obtained in step (b) to obtain an aqueous solution comprising a mixture of sulfuric and phosphoric acid.

2. A process according to claim 1, wherein the stoichiometric sulfuric acid excess exceeds about 0.2 up to about 0.5.

3. A process according to claim 1, wherein the calcination time in the presence of concentrated sulfuric acid is between about 3 and 4 hours.

4. A process according to claim 1, wherein the calcination temperature is between about 230° and 240° C.

5. A process according to claim 1, wherein the concentrated sulfuric acid has a concentration above about 90 percent.

6. A process according to claim 1, wherein the concentrated sulfuric acid has a concentration above about 96 percent.

7. A process according to claim 1, wherein the controlled take-up water/calcined mass weight ratio is between about 0.2 and 5.

8. A process according to claim 1, wherein the controlled take-up water/calcined mass weight ratio is between about 0.8 and 1.2.

9. A process according to claim 1, wherein the water take-up takes place at a temperature below about 100° C.

10. A process according to claim 1, wherein the water take-up takes place at a temperature of between about 0° and 40° C.

11. A process according to claim 1, wherein the controlled take-up is carried out for a time between about 1 minute and 1 hour.

12. A process according to claim 1, wherein the controlled take-up is carried out for a time between about 5 minutes and 15 minutes.

13. A process according to claim 1, wherein the residue is washed with water, for a time less than about 1 minute following the controlled take-up and separation of the solid residue and the aqueous phase.

14. A process according to claim 13, wherein the washing water is combined with the take-up water of the calcined mass.

15. A process according to claim 1, wherein the phosphatic rock comprises calcium aluminophosphate of the Thies deposits.

16. A process according to claim 1, wherein, in addition, the aqueous solution comprising the phosphoric and sulfuric acids is reacted with a tricalcium phosphate and then the reaction product is separated into a solid which mainly contains gypsum and an aqueous solution which mainly contains phosphoric acid.

17. A process according to claim 16, wherein the tricalcium phosphate quantity used in the reaction is such that there is substantially a stoichiometric equilibrium between the calcium of the tricalcium phosphate and the sulfuric acid present in the leaching solution.

18. A process according to claim 16, wherein after separating the gypsum and the aqueous phosphoric acid solution, the gypsum residue is washed with water, and in that the washing water is recycled in the controlled water take-up stage to constitute a fraction of the control take-up water after sulfuric calcination of the calcium aluminophosphate.

19. A process according to claim 18, wherein the other fraction of the controlled aqueous take-up solution is constituted by the washing water of the residue of the filtration of the take-up suspension performed with water after sulfuric calcination of the calcium aluminophosphate.

* * * * *